March 2, 1971     R. E. FOSTER     3,567,207

AIR CUSHION SPRING

Filed Feb. 26, 1969

INVENTOR.
RICHARD E. FOSTER
BY *John F. Lieberth*
ATTORNEY

United States Patent Office 3,567,207
Patented Mar. 2, 1971

3,567,207
AIR CUSHION SPRING
Richard E. Foster, 5342 Sycamore Drive,
Baton Rouge, La. 70805
Filed Feb. 26, 1969, Ser. No. 802,342
Int. Cl. F16f 5/00
U.S. Cl. 267—65
10 Claims

ABSTRACT OF THE DISCLOSURE

Shock absorbing support systems for vehicles are described. The systems involve, inter alia, a group of horizontal plates between which a film or volume of air is maintained. The system enables the passenger to literally ride on air without loss of vehicular traction and control.

GENERAL FIELD

This invention relates to shock absorbing support systems for vehicles, such as automobiles, trucks, tractors, railroad cars, and the like. More particularly, this invention is concerned with systems of this type wherein air or other suitable gas is used to support the body of the vehicle and wherein the flow or movement of air or gas is used to cushion the body against physical shock from the wheels.

BACKGROUND AND OBJECTS

The use of mechanical springs (e.g., leaf springs, coil springs) and hydraulic shock absorbers in the suspension systems for motorized vehicles has become commonplace. These systems are durable and relatively inexpensive, and afford a relatively smooth ride. Nevertheless, a welcome contribution to the art would be a suspension system enabling the vehicle to ride on air while still retaining all of the mechanical features of present-day steering, traction, propulsion and braking systems. Heretofore proposals along these lines (e.g., U.S. 2,721,616) have involved use of inflated pneumatic cushions in order to provide resilient support. However, the efficacy of such systems depends upon continued integrity of the cushion walls—in the event of a puncture or other form of leakage, the system becomes inoperative.

An object of this invention is to provide a system enabling the vehicle to literally ride on air.

Another object is to provide an air cushion spring which does not depend upon the use of airtight flexible cushions or other flexible airtight containers where leakage poses a serious threat to proper operation.

A further object is to provide an air cushion spring in which a plurality of air cushions is employed in an integrated airtight system which can, if desired, be fitted with means for keeping the system in operation even in the event of a puncture or the like.

Other important objects, advantages, features and characteristics of this invention will be apparent from the ensuing description, appended claims and figures of the drawing.

BRIEF DESCRIPTION OF THE INVENTION

Figure 1:
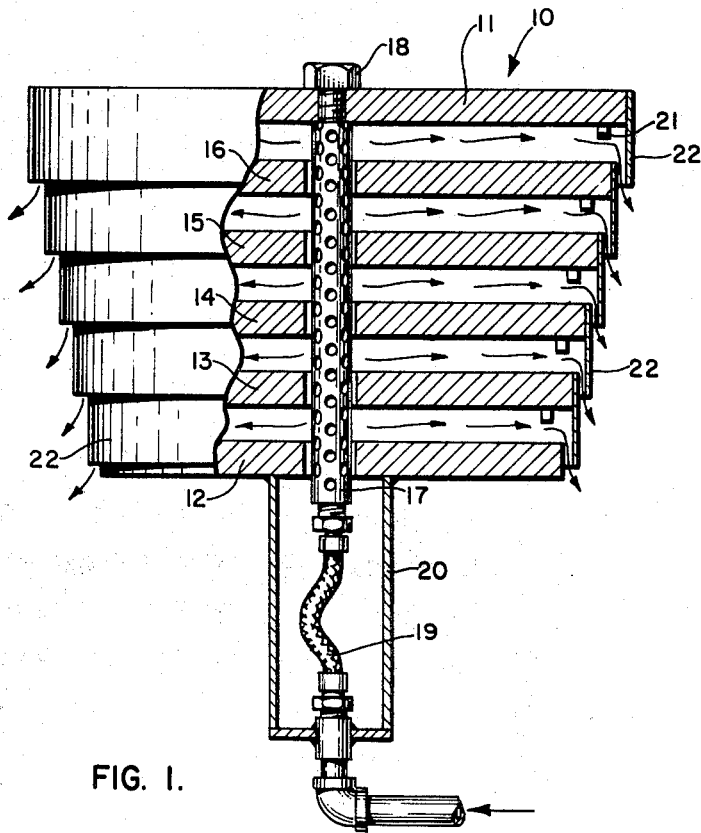
FIG. 1 is a side elevational view, partly broken away and in section, of an air cushion spring illustrative of this invention.

As can be seen from FIG. 1, one of the shock absorbing support systems of this invention involves passing air through a unit composed of a stack of axially aligned escalatable horizontal plates disposed between a pair of spaced apart horizontal planar surfaces. In this way each plate is supported by a volume or film of air continuously flowing between the lower surface of the plate and the upper horizontal surface of the next lower member. Thus each plate with its film of flowing air serves as a platform for each and every plate above it.

Figure 2:
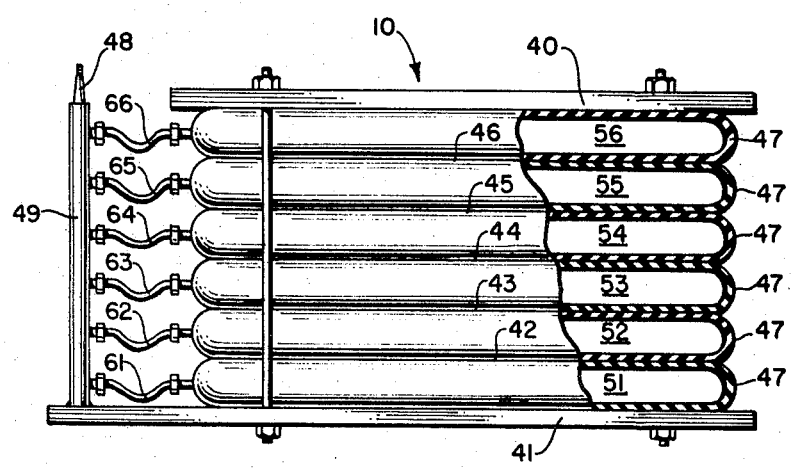
FIG. 2 depicts in side elevational view, partly broken away and in section, another form of air cushion spring of this invention.

The embodiment illustrated in FIG. 2 differs from that in FIG. 1 in that the flow of air is not continuous. Rather, the air is caused to flow in response to a shock impulse transmitted upwardly from the wheels. Thus the supported vehicle body is isolated from shock impulses transmitted through its supporting environment, the isolation being accomplished in part by periodical flow of air in response to the shock impulse itself.

Hence the embodiment of FIG. 1 involves a continuous flow of gas both to support the body of the vehicle and to cushion it against physical shock from the wheels. The embodiment of FIG. 2 involves the use of more or less quiescent gas to support the vehicular body and relies in part on intermittent flow of gas to ward off the physical shock.

DETAILED DESCRIPTION—
EMBODIMENT OF FIG. 1

Referring in particular to the embodiment depicted in FIG. 1, the air cushion spring, indicated generally as 10, involves a pair of planar surfaces 11, 12 between which are disposed a plurality of plates 13, 14, 15, 16. All of these members are axially aligned and each is in a generally horizontal plane. Plates 13, 14, 15, 16 may have any suitable configurtion—e.g., they my be circular, square, rectangular, triangular, pentangular, hexangular, octangular, etc., and in vertical cross section they may be rectangular (as shown), convex, concave, or the like. Conduit 17 passes upwardly through appropriately sized apertures centrally positioned in each of planar surface 12 and plates 13, 14, 15, 16. Normally these apertures will be only a bit larger in diameter than the diameter of conduit 17 so there will be a loose, slip fit. Conduit 17 is fastened to planar surface 11 by means of machine screw 18 which passes through that member and thence into the end of conduit 17 which carries a matching thread. Machine screw 18 also serves as an airtight seal for the end of conduit 17. Conduit 17 is provided with apertures (as shown), slits, or other suitably shaped and positioned openings for the passage of air between the planar surfaces 11, 12 and amongst plates 13, 14, 15, 16. Compressed air or the like is delivered to conduit 17 by means of flexible line 19 which leads from a suitable source (not shown), such as a compressed air tank, air pump, or the like. Canister 20 is affixed to the bottom of planar surface 17 and fastened tightly to line 19 so as to provide an airtight closure about the lower apertures in conduit 17 when the system is at rest (no air flow).

Attached to the bottom of planar surface 11 and of plates 13, 14, 15, 16 are stops 21 which insure that there will be horizontal openings between each of these members when the system is at rest. Skirts 22 also depend downwardly from these members, each such skirt extending around the entire periphery the member from which it depends. While not essential, these skirts or other similar members, such as rings or bands, positioned at or near the periphery of each plate assist in insuring the maintenance of a suitable volume of air between the plates by imposing a modest back-pressure on the system. Also these members lessen the likelihood of mud, gravel or other road debris becoming lodged within the interior of the system. It will be evident that skirts 22 may be formed of a flexible material and positioned such that when the system is at rest they abut the periphery of their respective next lower plates (and of planar surface 12 as well) but when the system is turned on skirts 22 are deflected outwardly to permit escape of air.

From FIG. 1 it will be clear that the system is capable of telescoping, either upwardly and away from planar surface 12 (as shown) when the air flow is turned on, or downwardly and toward planar surface 12 when the air flow is discontinued.

It will be noted that in the embodiment of FIG. 1, conduit 17 serves a three-fold purpose. First, it serves as a means of directing a continuous flow of air between the plates. Secondly, it serves as an inverted peg along which the centrally apertured plates may escalate up and down. Thirdly, conduit 17 tends to keep the plates in axial alignment.

In actual practice, the vehicle will normally be equipped with four air cushion springs of this invention, one pair for the front suspension system and one pair for the rear suspension system. The size of the plates and the pressure of the air between the plates will of course vary depending upon the size and weight of the vehicle being supported, the type of service to be encountered, the particular design of the air cushion springs being used, and the like. For example, a unit in which each plate has a surface area of one square foot when operated at an average pressure between the plates of five pounds per square inch gauge will support a weight of somewhat over 700 pounds. Thus for typical conditions of use gas pressures between about 5 to about 50 pounds per square inch gauge will suffice, pressures in the range of about 15–35 p.s.i.g. being most desirable in the ordinary situation. However, higher or lower pressures may be used if desired.

The number of plates to be disposed between planar surfaces 11, 12 is likewise susceptible to considerable variation. The chief requirement is that there be at least two such plates and the total number present in any given design will be governed by such considerations as the area of the plates, the air pressure to be employed, the size of the vehicle with which the device is to be associated, the severity of the service to be encountered, and the like. Generally speaking the use of from two to about fifty plates in a given air spring of this invention will be found to suffice.

In cross section the plates will normally range from about 1/16 to about 3 inches although here again variations are permissible. Normally the plates will be fabricated from metallic sheets (especially lighter metals such as aluminum and its alloys, magnesium and its alloys, and the like) or from suitable plastics.

It will be evident from the foregoing description that as the air is caused to flow between the planar surfaces and amongst the plates these members are forced apart and each of the superposed horizontal planar members rides on a cushion or film of flowing air. It is well recognized that tremendous loads can be moved over a single thin film of flowing air (ground effect machines) and thus although compressible, the films of flowing air in the air cushion springs of this invention cannot, under the conditions encountered in ordinary service, be compressed beyond a certain point. Thus under normal service conditions the planar surfaces of the air cushion springs of this invention do not touch each other when the systems are in operation.

Referring again to FIG. 1, when a compressive stress or shock impulse is encountered (e.g., a wheel goes over a bump in the road) this force is delivered to the lower planar surface 12 and thence to the layer of air flowing between surface 12 and plate 13. This results in some compression of that air layer and generation of some heat energy therein. Thus a portion of the total shock impulse is cushioned and dissipated in this lowermost air layer. This procedure is repeated over and over again in rapid sequence as the progressively reduced force is transmitted from the plate to film to next higher plate and so on. The sequential character of this force transmittal enables still another shock-inhibiting mechanism to come into play. In particular, compression of the air between 12 and 13 results in a reduction in the rate of air flow into that cavity and a corresponding increase in the air delivered to the cavities between 13 and 14, 14 and 15, and so on. Thus the pressure between each successively higher pair of plates tends to become progressively increased as the compressive force moves upwardly through the system. Consequently in a properly designed and functioning system at most only an inconsequential portion of the initial shock impulse reaches the upper planar surface 11 which of course is suitably connected to the body of the vehicle (not shown). The over-all result of this process is that the passenger literally rides on air in a smooth and vibration-free fashion. At the same time, the vehicle has full traction and control. In other words it is now possible to provide vehicles having an air cushion ride without the necessity of extensive revisions in the steering, driving and braking systems. And, air cushion springs of the character of FIG. 1 do not depend upon avoidance of leakage in flexible cushions or other similar containers—indeed this system utilizes continuous air flow through and away from the system.

DETAILED DESCRIPTION—EMBODIMENT OF FIG. 2

FIG. 2 depicts an embodiment of this invention where air or other suitable gas (e.g., nitrogen) is utilized in mobile confinement within a pneumatic plural plate closed spring device. This system has as its major advantage the fact that the system does not require a continuous flow of gas. Instead, the system may be charged with the proper amount of gas—e.g., in much the same way as tires are inflated—and periodically gas will automatically flow within the system to help insulate the body from shock impulses transmitted via the wheels. In addition, the vehicle literally rides on air and remains under full traction and control. Although the system in its simplest forms requires airtight-flexible pneumatic containers, it is possible to utilize an auxiliary automatic seal off system (discussed hereinafter) which will keep the system in operation even if the system sustains a puncture or other form of leakage.

Referring now in particular to FIG. 2 the air cushion spring, indicated generally as 10, is composed of a pair of planar surfaces 40, 41 between which are disposed plates 42 through 46, inclusive. In this case, however, the plates also serve as the horizontal walls of a plurality of superimposed, axially aligned, generally horizontal pneumatic cushions 51 through 56, inclusive. In other words these planar surfaces and plates cooperate with vertical continuous flexible end walls 47 to form the respective cushions which, viewed from the top, may be square, circular or the like. The interior air space of each of cushions 51 through 56 is connected to trunk line 49 by an individual flexible tube 61 through 66, respectively. Air is delivered to trunk line 49 through check valve 48. Thus air spring 10 may be readily pumped up to its desired operating pressure, e.g., about 5 to about 50 p.s.i.g., as needed. As shown, rods or other suitable restraining members may be inserted through vertically aligned apertures (not shown) in planar surfaces 40 and 41 and around the circumference of cushions 51 through 56 in order to keep the cushions in vertical, stacked alignment. At the same time, each of the horizontal surfaces (i.e., planar surfaces 40, 41 and plates 42 through 46) will remain free to escalate up and down in a generally vertical plane in the event an upward or downward force is imposed on the system.

In operation the air spring 10 is of course under compression due to the weight of the vehicle body pressing downwardly on planar surface 40. When a shock impulse is delivered via the wheels to planar surface 41 cushion 51 is compressed so that there is some distention of flexible wall 47 of cushion 51, some flow of air out of cushion 51 via line 61 and some heat generated within 51. All of these factors dissipate some of the vertically directed force. Additionally, the flow of air out of cushion 51 causes a corresponding inflow of air amongst cushions 52 through 56 so that their pressures are temporarily elevated to some extent. When the partially dissipated shock wave or impulse traverses cushion 51 it causes upward movement of wall 42 thereby engendering partial compression of and displacement of air within cushion 52. Accordingly, the occurrences vis-a-vis cushion 51 are repeated in connection with cushion 52 and thence in cushion 53 and so on. In each successive cushion additional energy of the initial shock impulse is dissipated and each time the progressively diminishing upward force is met by a progressively increasing resistance. Hence the system functions to shield planar surface 40 from excessive upward shock impulses and thereby provides the passenger with a smooth, air-borne ride.

The system of FIG. 2 may be modified, if desired, by connecting the lower portion of trunk line 49 to a reservoir of air, such as a suitably sized tank. In accordance with this modification when the entire system is at equilibrium the pressure is uniform throughout the system. However when the air cushion spring 10 is under added compression due to the imposition of an upward or downward shock, air will tend to flow toward the reservoir. Conversely, if air cushion spring is under less than normal compression, air will flow from the reservoir into the air cushion spring and thereby equilibrate the pressure.

As noted above, the system of FIG. 2 may be modified by means of an auxiliary automatic seal off system which will keep the system operational even if one of the flexible end walls 47 suffers a puncture or other type of unwanted leakage. To accomplish this sealing off, trunk line 49 is attached to an air reservoir as described above, and each of tubes 61 through 66 is fitted with an automatically actuated valve which will close off the tube in response to a signal from a pressure detector located within the reservoir. In the event of a puncture of one of the flexible end walls 47 the pressure in the entire system will of course start to diminish. When it drops to a predetermined level the detector will promptly cause the actuating means to close all of the valves within tubes 61 through 66. Thereupon the cushions whose wall has been punctured is free to go flat. The remaining cushions will still remain inflated and thus capable of supporting the vehicle and providing some shock insulation, albeit at reduced efficiency, until the system can be repaired.

In practice, each cushion will normally be formed as an integral unit composed of an upper and a lower wall joined around their peripheries by the vertical wall and thus may be made from reinforced elastomeric materials, such as rubber reinforced with glass, rayon or nylon cord or mesh. These cushions are then simply stacked one on top of the other so that, in effect, the top wall of one cushion and the bottom wall of the next higher cushion serve in unison as one plate. However, if desired, the air cushion spring of FIG. 2 may be fabricated from fairly rigid plates (metallic or plastic plates, for example) to which are adhesively bonded the flexible walls 47 made from a suitable elastomer or the like. Tubes 61–66 may be made from elastomeric or flexible tubing, e.g., natural or synthetic rubber tubing, polytetrafluoroethylene tubing, or the like.

The air cushion spring of FIG. 2 will be employed on the vehicle in much the same fashion as that of FIG. 1. Thus in the usual case the vehicle will be provided with four such springs, one for each wheel system, and each unit will be composed of from three to about ten cushions. It is convenient to position the air cushion springs between the axle and the frame or associated support members upon which the body is mounted although of course it can readily be appreciated that there are a considerable number and variety of ways by which the present air cushion springs may be utilized on the vehicle.

I claim:
1. A shock absorbing support system for vehicles which comprises:
    (a) a pair of spaced apart axially aligned horizontal planar surfaces;
    (b) a plurality of axially aligned horizontal plates interposed between said surfaces, each such plate being free to escalate up and down between said surfaces; and
    (c) means for keeping air between said plates to maintain them in spaced apart stacked relationship, said means being adapted to direct a continuous flow of air between said plates.
2. The system of claim 1 wherein said means direct a continuous flow of air between said plates at a pressure between about 5 to about 50 pounds per square inch gauge.
3. The system of claim 1 wherein said means also tend to keep said plates in axial alignment.
4. The system of claim 1 wherein further means are provided to keep said plates in spaced apart relationship when said flow is discontinued.
5. The system of claim 1 wherein said means also tend to keep said plates in axial alignment and wherein further means are provided to keep said plates in spaced apart relationship when said flow is discontinued.
6. A shock absorbing support system for vehicles which comprises:
    (a) a pair of spaced apart axially aligned horizontal planar surfaces;
    (b) a plurality of axially aligned horizontal plates interposed between said surfaces, each such plate being free to escalate up and down between said surfaces; and
    (c) means for keeping air between said plates to maintain them in spaced apart stacked relationship, said means further including means for directing periodical flow of air between a portion of said plates in response to the imposition of a shock impulse upon the system.
7. The system of claim 6 wherein said plates are composed respectively of the top wall of a cushion serving in unison with the adjacent bottom wall of a next higher cushion.
8. The system of claim 6 wherein said plates are composed respectively of the top wall of a cushion serving in unison with the adjacent bottom wall of a next higher cushion and wherein the air spaces of all of said cushions are interconnected by means of flexible tubes leading from the respective cushions to a common trunk line.
9. The system of claim 6 wherein said plates are composed respectively of the top wall of a cushion serving in unison with the adjacent bottom wall of a next higher cushion and wherein said means are airtight flexible walls peripherally and circumferentially joining the top and bottom walls of each respective cushion.
10. The system of claim 6 wherein said plates are composed respectively of the top wall of a cushion serving in unison with the adjacent bottom wall of a next higher cushion, wherein the air spaces of all of said cushions are interconnected by means of flexible tubes leading from the respective cushions to a common trunk line, and wherein said means are airtight flexible walls peripherally and circumferentially joining the top and bottom walls of each respective cushion.

References Cited
UNITED STATES PATENTS 3,179,398    4/1965    Pepper _____ 267—65

JAMES B. MARBERT, Primary Examiner